(12) United States Patent
Rustam et al.

(10) Patent No.: US 9,713,356 B2
(45) Date of Patent: Jul. 25, 2017

(54) GOLF SHOE OUTSOLES

(71) Applicant: Taylor Made Golf Company, Inc., Carlsbad, CA (US)

(72) Inventors: Ernie Rustam, Ho Chi Minh (VN); Juergen Weidl, Aurachtal (DE)

(73) Assignee: TAYLOR MADE GOLF COMPANY, INC., Carlton, CA (US)

(*) Notice: Subject to any disclaimer, the term of this patent is extended or adjusted under 35 U.S.C. 154(b) by 72 days.

(21) Appl. No.: 14/513,582

(22) Filed: Oct. 14, 2014

(65) Prior Publication Data
US 2015/0366289 A1    Dec. 24, 2015

Related U.S. Application Data

(60) Provisional application No. 61/896,442, filed on Oct. 28, 2013.

(51) Int. Cl.
| | |
|---|---|
| A43B 5/00 | (2006.01) |
| A43B 13/12 | (2006.01) |
| A43B 13/16 | (2006.01) |
| A43B 13/18 | (2006.01) |
| B29D 35/14 | (2010.01) |
| B29D 35/10 | (2010.01) |
| A43B 13/26 | (2006.01) |
| B29K 75/00 | (2006.01) |
| B29K 105/04 | (2006.01) |

(52) U.S. Cl.
CPC ............ *A43B 5/001* (2013.01); *A43B 13/122* (2013.01); *A43B 13/16* (2013.01); *A43B 13/188* (2013.01); *A43B 13/26* (2013.01); *B29D 35/10* (2013.01); *B29D 35/142* (2013.01); *B29K 2075/00* (2013.01); *B29K 2105/04* (2013.01); *B29K 2995/0082* (2013.01)

(58) Field of Classification Search
CPC ....... A43B 3/0057; A43B 5/001; A43B 13/12; A43B 13/122; A43B 13/16; A43B 13/188; B29D 35/122; B29D 35/142
USPC .............. 36/103, 127, 25 R, 30 R, 30 A, 31
See application file for complete search history.

(56) References Cited

U.S. PATENT DOCUMENTS

| | | | | |
|---|---|---|---|---|
| 5,147,589 | A * | 9/1992 | Chang | B29C 37/005 156/245 |
| 6,000,923 | A * | 12/1999 | Lo | B29C 33/26 249/172 |
| 6,289,611 | B1 * | 9/2001 | Patterson | A43B 5/001 36/127 |
| 8,414,811 | B1 * | 4/2013 | De Santis | B29D 35/148 264/250 |

(Continued)

FOREIGN PATENT DOCUMENTS

| | | | | |
|---|---|---|---|---|
| DE | EP 2649896 | A2 * | 10/2013 | ............. A43B 13/04 |
| EP | 1704177 | | 9/2006 | |

(Continued)

*Primary Examiner* — Sharon M Prange
(74) *Attorney, Agent, or Firm* — Klarquist Sparkman, LLP

(57) ABSTRACT

Exemplary methods for making a golf shoe outsole comprise first forming a lower portion of the outsole of a first material comprising thermoplastic polyurethane, and then forming an upper portion of the outsole by pouring a liquid second material comprising polyurethane or expandable thermoplastic polyurethane onto an upper surface of the lower portion.

15 Claims, 9 Drawing Sheets

(56) References Cited

U.S. PATENT DOCUMENTS

| | | | | |
|---|---|---|---|---|
| 8,677,657 B2* | 3/2014 | Bacon | ............ | A43B 5/001 |
| | | | | 36/103 |
| 9,205,615 B2* | 12/2015 | Maranan | ............ | B29D 35/122 |
| 2010/0047550 A1 | 2/2010 | Prissok et al. | | |
| 2010/0222442 A1 | 9/2010 | Prissok et al. | | |
| 2012/0065285 A1 | 3/2012 | Braun et al. | | |
| 2012/0329892 A1 | 12/2012 | Prissok et al. | | |
| 2013/0126075 A1* | 5/2013 | Jiang | ............ | B29C 65/02 |
| | | | | 156/219 |
| 2014/0366402 A1* | 12/2014 | Cavaliere | ............ | A43B 13/14 |
| | | | | 36/25 R |

FOREIGN PATENT DOCUMENTS

| | | |
|---|---|---|
| EP | 1979401 | 10/2008 |
| WO | WO2005066250 | 7/2005 |
| WO | WO2007082838 | 7/2007 |
| WO | WO2008087078 | 7/2008 |
| WO | WO2010136398 | 12/2010 |

* cited by examiner

GOLF SHOE OUTSOLES

CROSS REFERENCE TO RELATED APPLICATION

This application claims the benefit of U.S. Provisional Patent Application No. 61/896,442, filed Oct. 28, 2013, which is hereby incorporated herein by reference in its entirety.

FIELD

This application relates to golf shoes and particularly to golf shoe outsoles.

BACKGROUND

Golf shoes play an important role during a golfer's swing. A golf shoe supports the golfer's foot while allowing the golfer's foot to flex and transfer forces between the golfer's body and the ground. The golfer's footwork is important to the execution of a proper and effective golf swing.

The golfer's footwork during the swing is nuanced and differs from left foot to right foot. In general, for most golf shots the golfer's weight is initially distributed 50/50 on each foot and the weight is centered in the middle of each foot. During the backswing, the golfer's weight should shift to the outside (lateral side) of the golfer's back foot while the front foot maintains some weight for balance. The backswing applies forces tending to spin or pivot the back forefoot outwardly and the back heel inwardly, which must be resisted by the back foot's contact with the ground to keep the golfer's back foot stable. During the downswing of the club, the golfer's weight begins to shift and by the time the golf ball is struck, the golfer's weight is evenly balanced on the back foot and front foot or has started to shift more to the front foot. At the finish position of the swing, most of the golfer's weight is on the front foot with more weight on the outside (lateral side) of the front foot than the inside (medial side), and the golfer's heel and shoe outsole of golfer's back foot are elevated above the ground and face rearwardly. In a proper swing, only the toe of the golfer's back foot remains in contact with the ground at the finish. In the finish position, the heel and most of the outsole of the golfer's rear shoe are off of the ground, with only the toe contacting the ground for balance. During the swing, the golfer's foot makes complex movements to keep the golfer balanced while generating torque.

In conventional golf shoes, the outsole includes a rigid base platform that supports various traction elements in way that provides very little independent movements between the traction elements. Typically, the outsole moves as a rigid unit such that when the heel lifts or the foot tilts to the side, a majority of the sole lifts off the ground and loses traction, leaving only the toe or a side edge in tractional contact with the ground.

Furthermore, in conventional golf shoes, the rigid outsole lacks cushioning or flexibility and can be uncomfortable to a golfer compared to other types of athletic shoes. The various components of a convention golf shoe are typically cemented or bound together in a rigid manner that limits flexibility and comfort.

SUMMARY

Described herein are novel golf shoe outsoles and methods for making them. Exemplary outsoles described herein can comprise one or more polymeric components which form a base subunit that in turn serves as the lower part of the outsole and provides various traction elements, and a polymeric fill portion that forms a cushioning upper part of the outsole and is formed by pouring a liquid polymeric material onto the upper surfaces of the lower part. For example, the lower part of the outsole can be injection molded with one or more types of thermoplastic polyurethane (TPU) and the upper part of the outsole can comprise polyurethane (PU) that is poured onto the TPU in a mold.

Outsoles described herein can provide increased comfort and performance compared to conventional golf shoe outsoles having a rigid platform that spans the sole and supports the traction elements in a dependent manner. The poured upper part can provide a durable yet soft and comfortable region below the golfer's foot and can bond directly to the injection molded lower part without cement or other rigid adhesion materials. The lower part can comprise a durable yet flexible material and can include various traction elements supported independently from one another such that they can flex and move separately throughout the golf swing, which can result in more of the traction elements being in contact with the ground at any given time and can allow the golfer's foot to have more freedom of motion and more comfort. Outsoles described herein can be lighter than conventional outsoles due the use of lightweight polymeric materials, direct bonding of the constituent materials without cement, lack of other conventional platform components, and other properties.

Some embodiments of a golf shoe outsole include a lower portion made of TPU and having a lower traction surface, and an upper portion bonded to the lower portion for supporting a golfer's foot and made of PU or expandable TPU. The lower portion can comprise a first TPU material having a first hardness and a second TPU material having a second hardness that is less than the first hardness. The first TPU material can comprise a curved band that extends from a toe end of the outsole, along a lateral side of a forefoot region of the outsole, across an arch portion of the outsole, along a medial side of the outsole, and toward a heel end of the outsole. The lower portion can comprise an upper rim defining a recessed region along the upper side of the lower portion such that the upper portion fills the recessed region. The upper portion can be bonded directly to the lower portion without an intermediate adhesive material. The upper portion can comprise various foams and hybrid materials, such as a matrix of PU and foamed particles of TPU.

An exemplary method for making a golf shoe outsole comprises first forming a lower portion of the outsole from a first material including TPU, and then forming an upper portion of the outsole by pouring or injecting a liquid second material including PU or expandable TPU into an open region defined by an upper surface of the lower portion. Forming the first portion of the outsole can include forming an inlay portion from a first type of TPU and forming a base portion from a second type of TPU, for example wherein the first type of TPU is harder than the second type of TPU. Forming the inlay portion can comprise placing at least one cleat receptacle into a mold and then injecting the first type of TPU into the mold such that the at least one cleat receptacle becomes contained within the inlay portion when the first type of TPU solidifies. Forming the first portion of the outsole can also comprise placing the inlay portion into a mold and then injecting the second type of TPU into the mold to form the base portion around the inlay portion. One or more additional cleat receptacles can also be placed into the mold separate from any cleat receptacles contained within the inlay portion, such that the one or more additional cleat receptacles become contained within the base portion when the second type of TPU solidifies.

Forming the upper portion of the outsole can comprise placing the lower portion of the outsole into a lower portion of a mold, pouring the liquid second material on top of the lower portion, closing an upper portion of the mold on top of the liquid second material, and causing the liquid second material to solidify within the mold. The second material can bond directly to the first material as it solidifies. In some embodiments, the second material becomes a foam when it solidifies.

Some methods for making a golf shoe outsole comprise placing a lower portion of an outsole into a mold and then pouring a liquid material into the mold on top of the lower portion, wherein the liquid material comprises PU or expandable TPU. Such methods can further comprise closing the mold and causing the liquid material to solidify into an upper portion of the outsole that is bonded directly to the lower portion of the outsole. Closing the mold can apply pressure to the liquid material causing the liquid material to flow across an upper surface of the lower portion and fill recesses in the upper surface of the lower portion.

The foregoing and other objects, features, and advantages of the invention will become more apparent from the following detailed description, which proceeds with reference to the accompanying figures.

DETAILED DESCRIPTION

Figure 1:
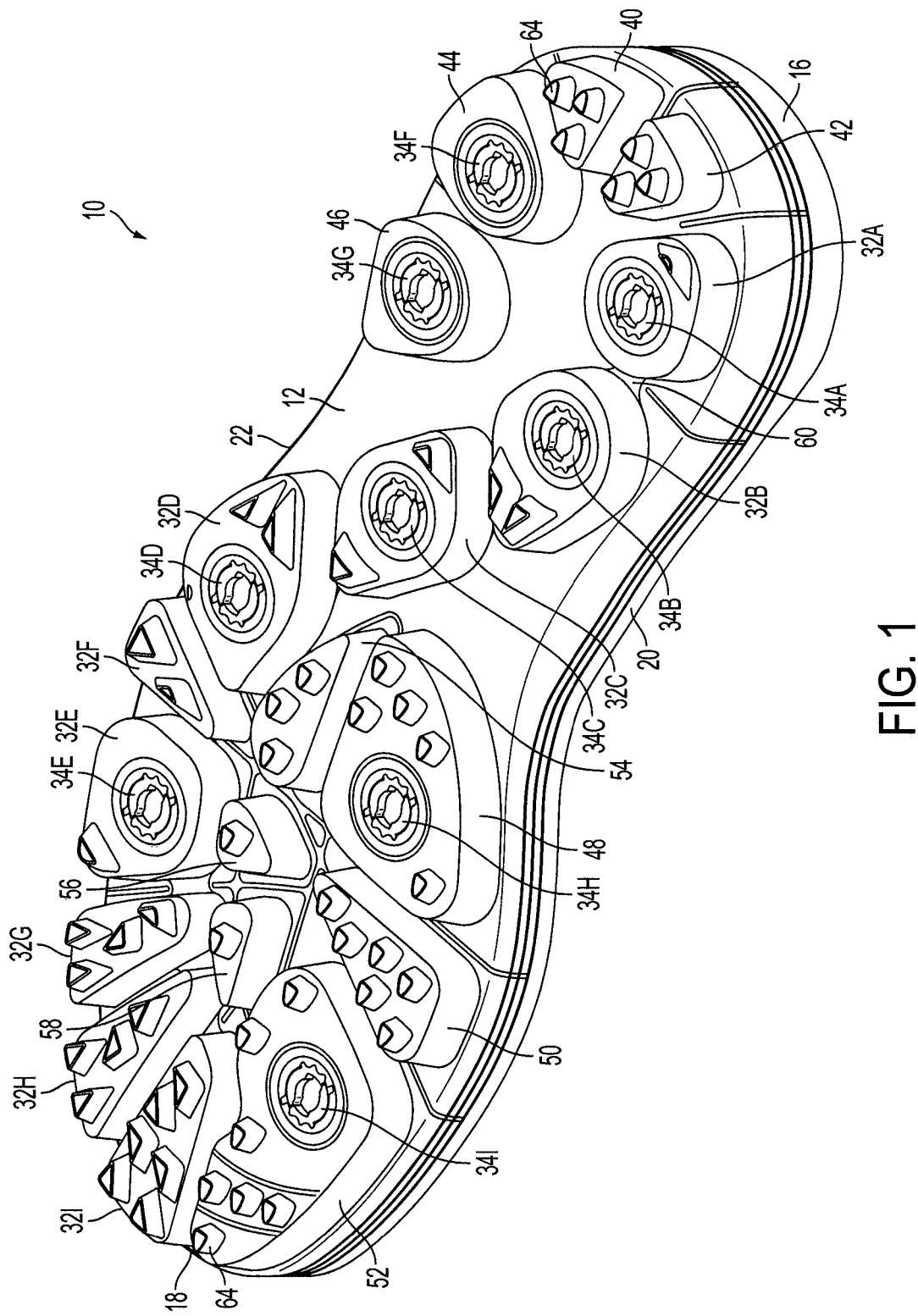
FIG. 1 is a perspective view of a bottom side of an exemplary golf shoe outsole.

The following description is exemplary in nature and is not intended to limit the scope, applicability, or configuration of the disclosed embodiments in any way. Various changes to the described embodiments may be made in the function and arrangement of the elements described herein without departing from the scope of the disclosure.

The term descriptions below are provided solely to aid the reader, and should not be construed to have a scope less than that understood by a person of ordinary skill in the art or as limiting the scope of the appended claims.

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer with a degree of neutralization of less than 100 percent.

The term "hydrocarbyl" is intended to mean any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "prepolymer" as used herein is intended to mean any material that can be further processed to form a final polymer material of a manufactured golf shoe, such as, by way of example and not limitation, a polymerized or partially polymerized material that can undergo additional processing, such as crosslinking.

A "thermoplastic" as used herein is intended to mean a material that is capable of softening or melting when heated and of hardening again when cooled. Thermoplastic polymer chains often are not cross-linked or are lightly cross-linked using a chain extender, but the term "thermoplastic" as used herein may refer to materials that initially act as thermoplastics, such as during an initial extrusion process or injection molding process, but which also may be cross-linked, such as during a compression molding step to form a final structure.

A "thermoset" as used herein is intended to mean a material that crosslinks or cures via interaction with as crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" as used herein is intended to mean a material prepared by reaction of a diisocyanate with a polyol, and optionally addition of a chain extender.

The term "thermoplastic polyurea" as used herein is intended to mean a material prepared by reaction of a diisocyanate with a polyamine, with optionally addition of a chain extender.

The term "thermoset polyurethane" as used herein is intended to mean a material prepared by reaction of a diisocyanate with a polyol, and a curing agent.

The term "thermoset polyurea" as used herein is intended to mean a material prepared by reaction of a diisocyanate with a polyamine, and a curing agent.

A "urethane prepolymer" as used herein is intended to mean the reaction product of diisocyanate and a polyol.

A "urea prepolymer" as used herein is intended to mean the reaction product of a diisocyanate and a polyamine.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

Similarly the term "unimodal polymer" refers to a polymer comprising one main fraction and more specifically to the form of the polymers molecular weight distribution curve, i.e., the molecular weight distribution curve for the total polymer product shows only a single maximum.

As used herein, a "blend composition" can be a physical mixture of components A and B and/or a reaction product produced by a reaction between components A and B.

The singular terms "a," "an," and "the" include plural referents unless context clearly indicates otherwise. The word "comprises" indicates "includes." It is further to be understood that all molecular weight or molecular mass values given for compounds are approximate, and are provided for description. The materials, methods, and examples are illustrative only and not intended to be limiting. Unless otherwise indicated, description of components in chemical nomenclature refers to the components at the time of addition to any combination specified in the description, but does not necessarily preclude chemical interactions among the components of a mixture once mixed.

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc., are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

Described herein are exemplary golf shoe outsoles and methods for making them. FIGS. 1-12 illustrate one exemplary embodiment of a golf shoe outsole 10, though this illustrated example should not be construed as limiting the scope of the disclosure. The outsole 10 comprises a bottom 12, top 14, rear end 16, front end 18, medial side 20, and lateral side 22. The illustrated outsole 10 is for a left-footed shoe, and a matching outsole for a right-footed shoe can have similar or identical features.

Figure 12:
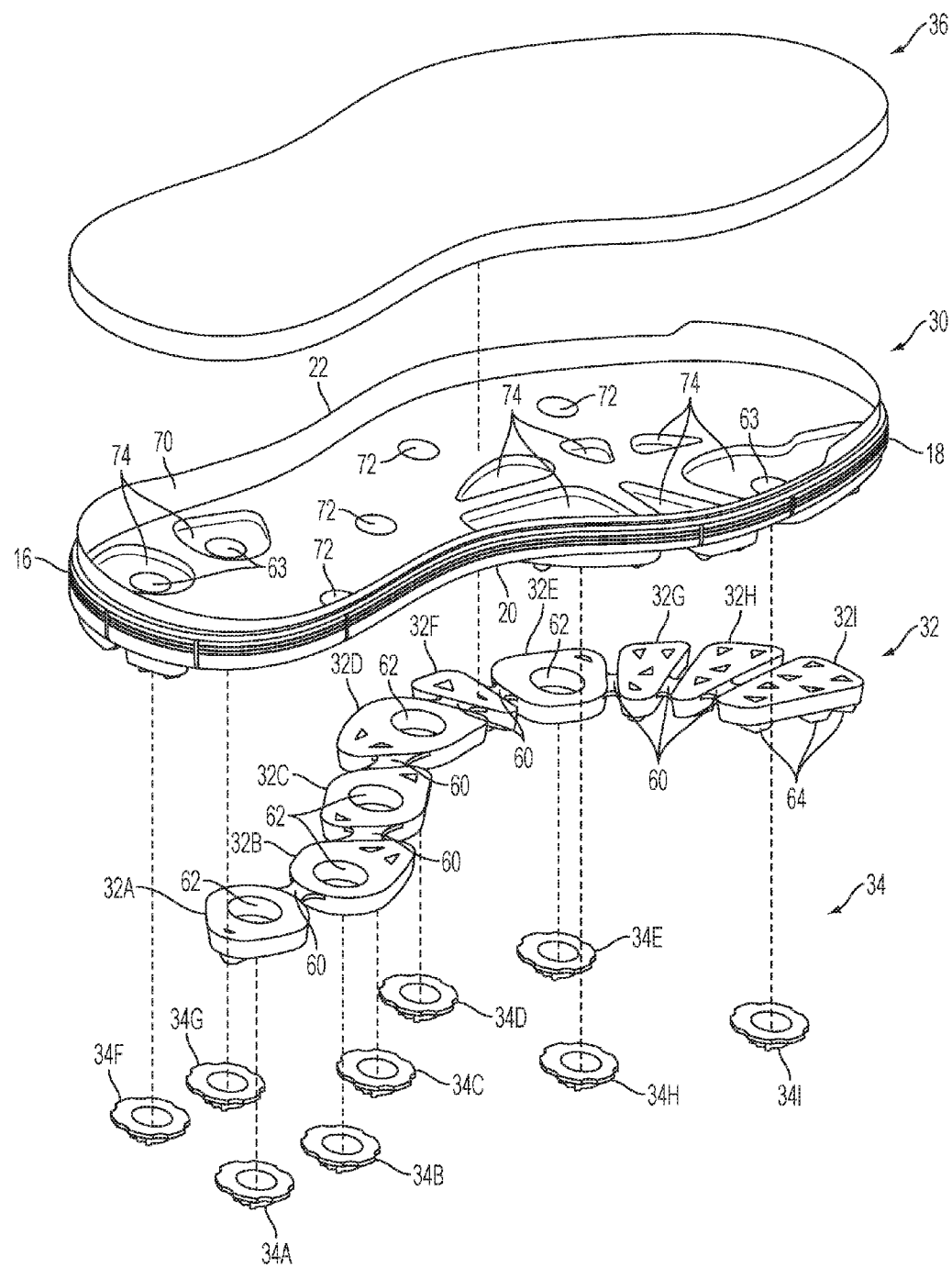
FIG. 12 is an exploded view of various components of the outsole of FIG. 1.

As shown in FIG. 12, the outsole 10 can comprise several components that are combined together using methods described herein to form a unitary one-piece outsole. The components of the outsole 10 can comprise a base portion 30, an inlay portion 32, a plurality of cleat receptacles 34, a fill portion 36, and/or other components.

Figure 2:
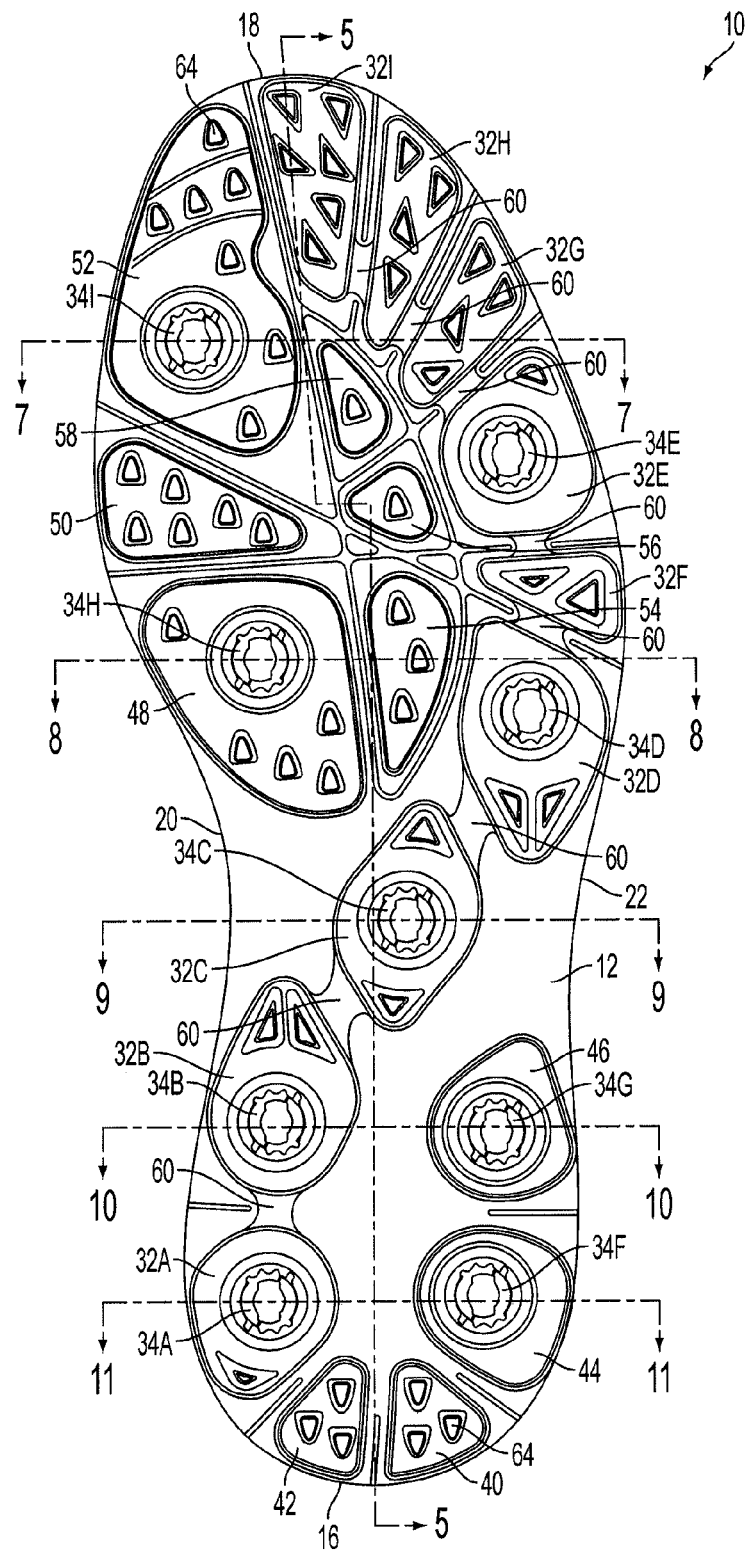
FIG. 2 is a bottom plan view of the outsole of FIG. 1.
Figure 3:
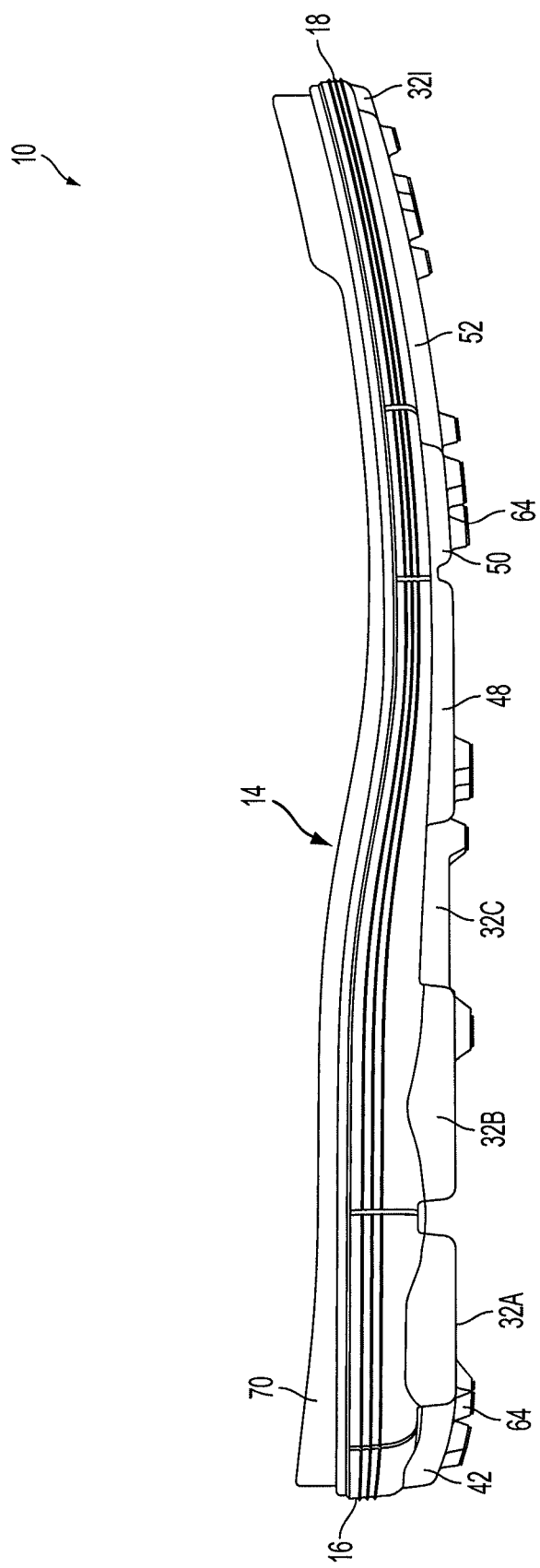
FIG. 3 is a medial side view of the outsole of FIG. 1.
Figure 4:
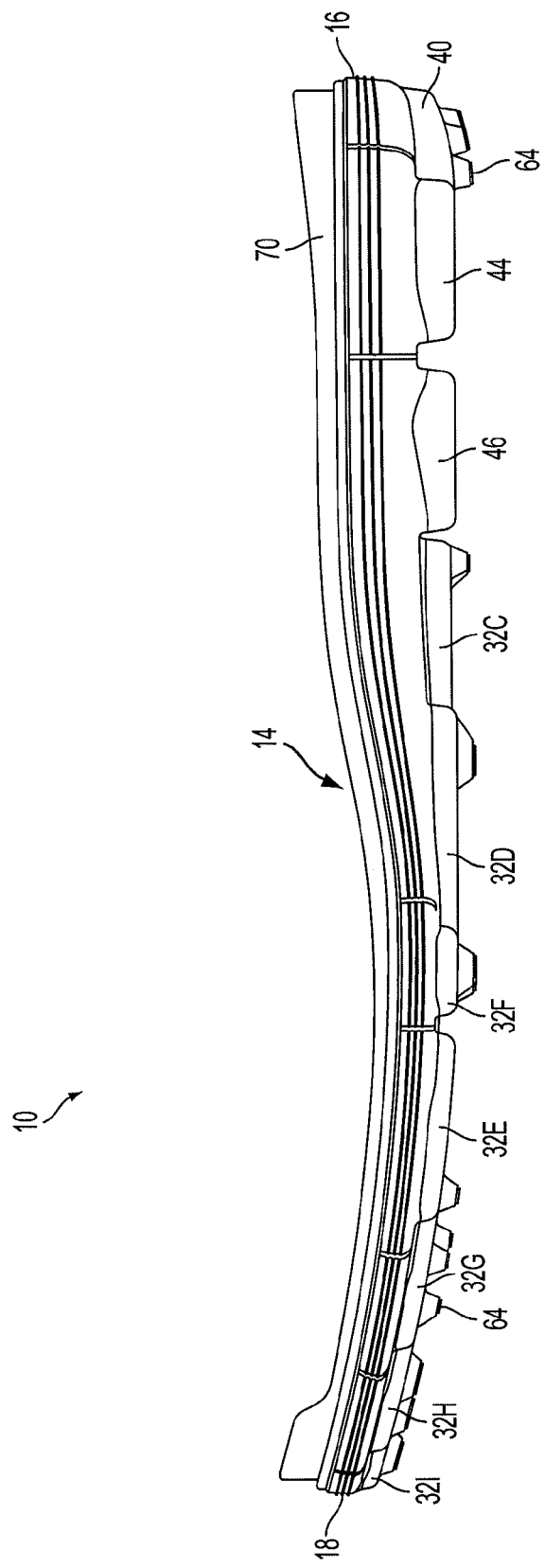
FIG. 4 is a lateral side view of the outsole of FIG. 1.
Figure 5:
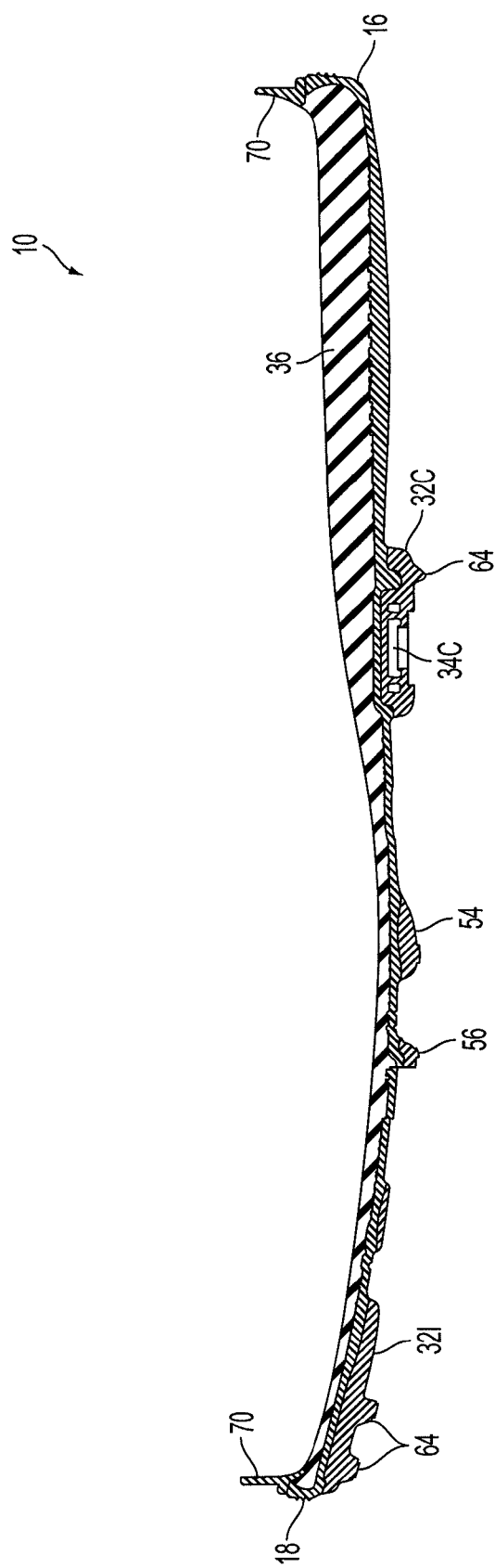
FIG. 5 is a cross-sectional view of the outsole of FIG. 1, taken along section line 5-5.
Figure 6:
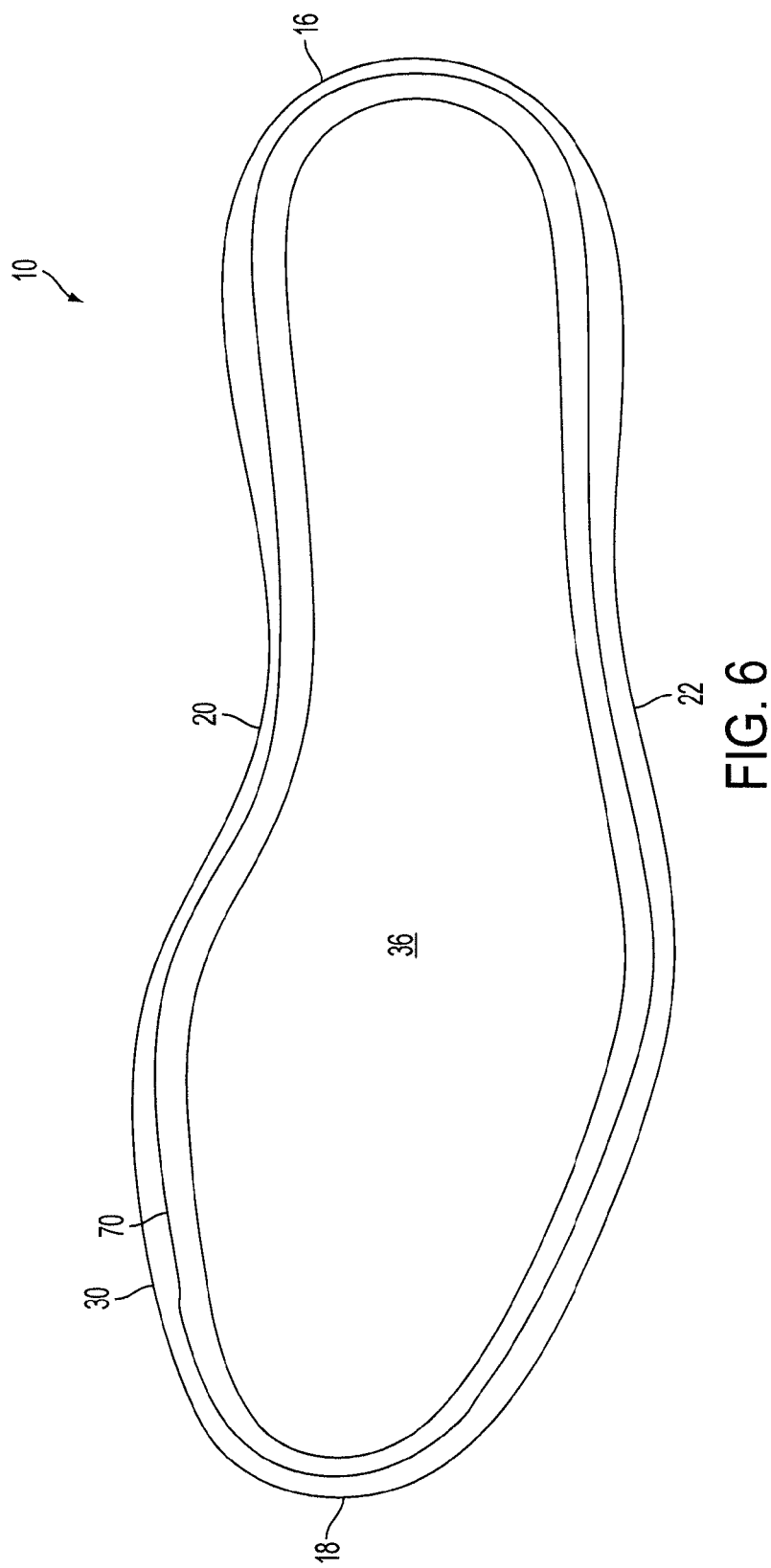
FIG. 6 is a top plan view of the outsole of FIG. 1.
Figure 7:
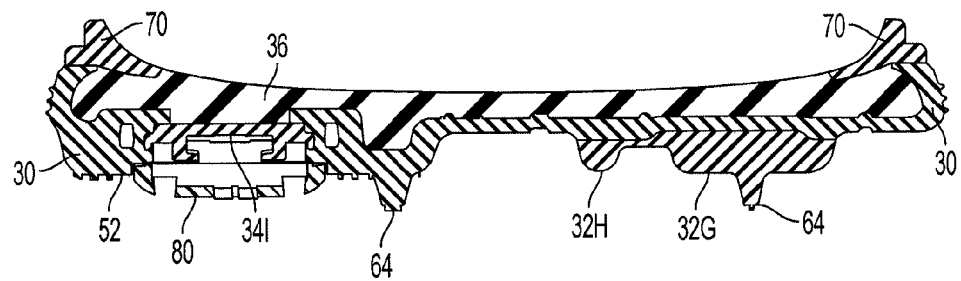
FIGS. 7-11 are cross-sectional views of the outsole of FIG. 1, taken along respective section lines.
Figure 8:
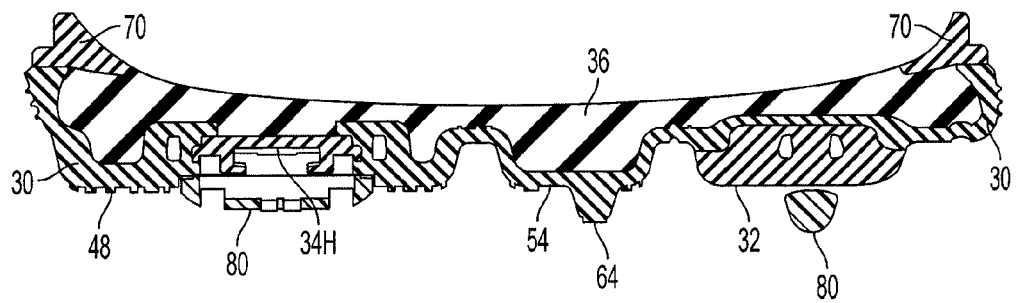
Figure 9:
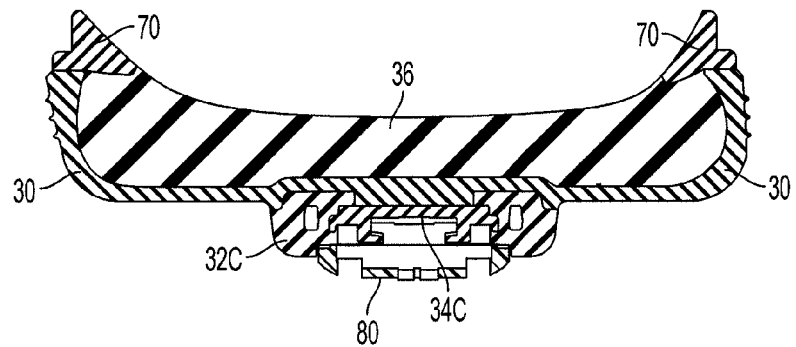
Figure 10:
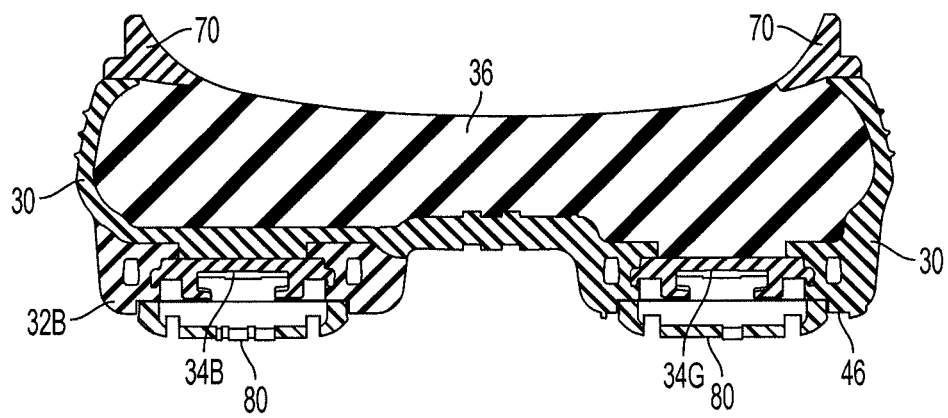
Figure 11:
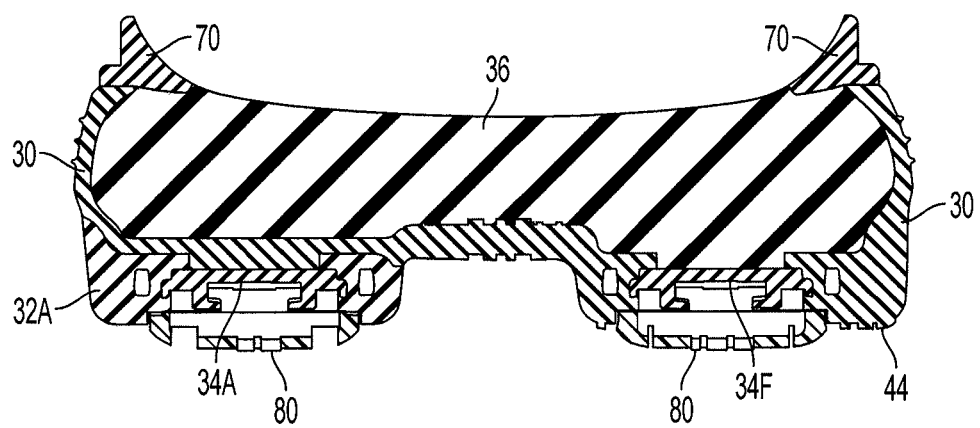

As shown in FIGS. 1, 2, and 12, the inlay portion 32 can comprise a series of platforms, such as the illustrated platforms 32A-32I, arranged in a curvilinear pattern extending from adjacent the heel end 16 of the outsole to adjacent the toe end 18 of the outsole. The platforms 32A-32I can be linked together by connector portions 60 between each adjacent pair of platforms, such that the inlay portion 32 forms a one-piece strip or chain. As shown in FIG. 2, the inlay portion 32 comprises platforms 32A and 32B located along a medial side of the rear, heel portion of the outsole, platform 32C located at an arch portion of the outsole about midway between the medial and lateral sides, and platforms 32D-32I located along the lateral side of the outsole from the mid-foot region forward to the toe end of the outsole.

The platforms 32A-32I can have varying sizes and shapes, as illustrated. Some of the platforms can comprise openings 62 (FIG. 12) that contain respective ones of the cleat receptacles 34A-34I, which are configured to retain removable cleats 80 (some examples of which are shown in FIGS. 7-11). The platform 32A can contain the receptacle 34A, the platform 32B can contain the receptacle 34B, the platform 32C can contain the receptacle 34C, the platform 32D can contain the receptacle 34D, and the platform 32E can contain the receptacle 34E. Others platforms of the inlay portion may not contain a cleat receptacle, such as the platforms 32F-32I. The platforms not containing cleat receptacles, such as platforms 32F-32I, can have smaller and/or more irregular shapes, such as generally triangular or quadrilateral shapes. In addition, any or all of the platforms can comprise one or more permanent nub cleats (some of which are labeled 64 throughout the drawings). The nub cleats 64 can be generally pyramidal, for example.

The base portion 30 of the outsole (see FIG. 12) can extend across a majority of the outsole from the heel end to the toe end and from the medial side to the lateral side. The base portion 30 can comprise a rim portion 70 extending upwardly around the perimeter of the outsole. The base portion 30 further comprises a plurality of downwardly projecting platforms, which can complement the platforms of the inlay portion 32. As shown, the base portion 30 comprises some platforms containing cleat receptacles and other platforms without cleat receptacles. Any or all of these platforms can comprise one or more permanent nub cleats 64.

Platforms 44, 46, 48, and 52 of the base portion 30 (see FIG. 2) comprise cleat receptacles 34F, 34G, 34H, and 34I, respectively. Platforms 44 and 46 are located along the lateral side of the heel portion of the outsole such that the cleat receptacles 34F and 34G are located approximately even with the cleat receptacles 34A and 34B, respectively, on the medial side of the heel portion. Platforms 48 and 52 are located along the medial side of the forefoot portion of the outsole.

Platforms 40, 42, 50, 54, 56, and 58 of the base portion 30 do not contain cleat receptacles. Platforms 40 and 42 are located at the rear end of the heel portion, platform 50 is located along the medial side of the forefoot region, and platforms 54, 56, and 58 are located in an intermediate portion of the forefoot region between the medial and lateral sides.

The base portion 30 includes a base layer that extends across a majority of the outsole 10 beneath the fill portion, as shown in FIGS. 7-12. The base layer can include various depressions and/or openings. As illustrated in FIG. 12, for example, the base layer can include depressions 74 in its upper surface corresponding to the locations of the platforms 44, 46, 48, 50, 52, 54, 56, and 58. Further, some of these depressions 74 can include apertures 63, such as in the regions above the cleat receptacles 34F, 34G, 34H, and 34I. As shown in FIGS. 7, 8, 10, and 11, the presence of such apertures 63 in the base portion 30 can allow the fill portion 36 to be in direct contact with the upper surfaces of the underlying cleat receptacles 34. In some embodiments, the base portion 30 can further comprise apertures above cleat receptacles contained in the inlay portion 32. Exemplary locations of such apertures are indicated as reference number 72 in FIG. 12. Note that the apertures 72 are not present in the views of FIGS. 10 and 11.

The outsole 10 described herein can be made using novel methods. In general, the base portion 30, the inlay portion 32, and/or the receptacles 34 are first formed together as a solid base subunit, and the fill portion 36 is then poured or injected in liquid form into contact with the upper surfaces of the base subunit and allowed to solidify and bond to the base subunit.

In an exemplary method for forming the outsole 10, the materials for each component (described in more detail below) are initially selected. The inlay portion 32 is then injection molded with the receptacles 34A, 34B, 34C, and 34D formed within the platforms 32A, 32B, 32C, and 32D, respectively. During this step, the receptacles 34A-34D are placed into a mold at predetermined locations relative to each other and the inlay material is injected into the mold and allowed to solidify and bond to the receptacles, forming an inlay subunit. Each of the platforms 32A-32I of the inlay portion 32 are connected together by the connector portions 6Q such that the formed inlay subunit is unitary.

In a subsequent step, the inlay subunit and the remaining cleat receptacles 34F-34I are placed into another mold at predetermined locations relative to each other and the base portion 30 material is injected into the mold. The base portion 30 material bonds with the inlay subunit and the receptacles 34F-34I and solidifies to form the base subunit, which comprises the base portion 30, the inlay portion 32, and all of the cleat receptacles 34.

The base subunit can then cleaned, primed, and/or painted before the fill portion 36 material is added. Priming and/or painting the base subunit can help the fill portion 36 bond to the base subunit. The priming and painting steps can include an application step and a subsequent heating step.

To apply the fill portion 36 material to the base subunit, the base subunit can be treated with a mold-release agent and then inserted into a fill mold. The fill mold can comprise, for one example, three portions including a concave bottom portion, an annular lateral portion, and a top portion. A release agent can be applied to the three portions of the mold before the base subunit is inserted. The base subunit can be placed in the bottom portion of the fill mold and the lateral portion of the fill mold can then be placed around the perimeter of the base subunit and against the bottom portion. The fill portion 36 material can then be poured or injected in liquid form on top of the base subunit. The top portion of the fill mold can then be applied on top of the lateral portion of the fill mold such that the mold is sealed closed around the base subunit and the liquid fill portion 36 material. Pressure applied by the top portion of the mold forces the liquid fill portion 36 material to flow and fill the recesses and depressions of the upper surface of the base subunit within the rim 70. The fill portion 36 is then heated to cause it to solidify and bond with the base subunit with an upper surface having a shape defined by the top portion of the fill mold, creating the outsole 10. Note that the shape of the fill portion 36 shown in FIG. 12 does not include the exact contours of the fill portion that can be created due to the shape of the upper surface of the base subunit and the contact surfaces of the top portion of the fill mold. In some embodiments, the fill portion 36 material can expand as it solidifies, helping the material to better fill all the nooks and recesses in the upper surface of the base subunit.

After the fill portion 36 is solidified and bonded to the base subunit, the fill mold is opened and the outsole 10 is removed. Subsequent cleaning and finishing of the outsole can also be included in the method.

In addition to the simple pour and gravity method of molding where the weight of the top of the mold forces the liquid polyurethane to conform to the desired shape of the mold other poured polyurethane molding methods may be used. These include Compression Molding where the liquid polyurethane is poured into an open mold and placed in a heated compression press and pressure is applied to extrude the material into all areas of the mold. Also included is so called Open Cast Molding where the liquid polyurethane is poured into an open mold which is placed in an oven or on a heated table. Another possible method is Spin Casting where the liquid polyurethane is poured into an open mold which is spinning. This process is designed to remove any air entrapped in the pouring process. Another option is Low Pressure Injection Molding where the liquid polyurethane is injected into a closed mold which is fastened together with bleed gates designed to allow the air to bleed out of the mold in the injection process.

The different components of the outsole 10 can comprise various materials. The cleat receptacles 34 can comprise any hard, durable material suitable for receiving and retaining removable cleats, such as nylon. It can also be desirable for material of the cleat receptacles 34 to be suitable for bonding with the material of the inlay portion 32.

The inlay portion 32 can comprise a relatively rigid, durable polymeric material that can be injection molded in liquid form. For example, the inlay portion 32 can comprise thermoplastic polyurethane (TPU). In some embodiments, the inlay portion 32 can comprise TPU having a Shore A hardness greater than the Shore A hardness of the material of the base portion 30. For example, the inlay portion 32 can comprise TPU having a Shore A hardness greater than 60, greater than 70, greater than 75, greater than 80, and/or greater than 85, such as about 90 is some specific examples. The material of the inlay portion 32 can also have a different color than the material of the base portion 30, such as a bright color having a high contrast relative to the color of the base portion.

Exemplary materials suitable for use in the inlay portion 32 and/or base portion 30 can comprise one or more of the following polymers. These polymers include, without limitation, synthetic and natural rubbers, thermoset polymers such as other thermoset polyurethanes or thermoset polyureas, as well as thermoplastic polymers including thermoplastic elastomers such as thermoplastic polyurethanes or thermoplastic polyureas, metallocene catalyzed polymers, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, polyamides, copolyamides, polyesters, copolyesters, polycarbonates, polyolefins, halogenated polyolefins, such as halogenated polyethylene [e.g. chlorinated polyethylene (CPE)], halogenated polyalkylene compounds, polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic block copolymers including styrene-butadiene-styrene (SBS), styrene-ethylene-butylene-styrene, (SEBS) and styrene-ethylene-propylene-styrene (SEPS), styrenic terpolymers, functionalized styrenic block copolymers including hydroxylated, functionalized styrenic copolymers, and terpolymers, cellulosic polymers, liquid crystal polymers (LCP), ethylene-propylene-diene terpolymers (EPDM), ethylene-vinyl acetate copolymers (EVA), ethylene-propylene copolymers, propylene elastomers (such as those described in U.S. Pat. No. 6,525,157, to Kim et al, the entire contents of which is hereby incorporated by reference in its entirety), ethylene vinyl acetates and polysiloxanes, and any and all combinations thereof.

The base resin for use in the inlay portion 32 and/or base portion 30 can include ethylene vinyl acetate (EVA). The ethylene vinyl acetate polymer, preferably has a vinyl acetate content between approximately 5% and approximately 50%, more preferably between approximately 5% and approximately 40%, and most preferably between approximately 5% and approximately 30%. The ethylene vinyl acetate polymer preferably has a mean molecular weight between approximately 5,000 and approximately 450,000, more preferably between approximately 10,000 and approximately 400,000, and most preferably between approximately 10,000 and approximately 350,000.

Another preferred material for use in the inlay portion 32 and/or base portion 30 is a polyamide. The term "polyamide" as used herein includes both homopolyamides and copolyamides. Illustrative polyamides include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

One example of a group of suitable polyamides are thermoplastic polyamide elastomers. Thermoplastic polyamide elastomers typically are copolymers of a polyamide and polyester or polyether. For example, the thermoplastic polyamide elastomer can contain a polyamide (Nylon 6, Nylon 66, Nylon 11, Nylon 12 and the like) as a hard segment and a polyether or polyester as a soft segment. In one specific example, the thermoplastic polyamides are amorphous copolyamides based on polyamide (PA 12).

One class of copolyamide elastomers are polyether amide elastomers. Illustrative examples of polyether amide elastomers are those that result from the copolycondensation of polyamide blocks having reactive chain ends with polyether blocks having reactive chain ends, including:

(1) polyamide blocks of diamine chain ends with polyoxyalkylene sequences of dicarboxylic chains;

(2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and (3) polyamide blocks of dicarboxylic chain ends with polyether diols, the products obtained, in this particular case, being polyetheresteramides.

More specifically, the polyamide elastomer can be prepared by polycondensation of the components (i) a diamine and a dicarboxylate, lactames or an amino dicarboxylic acid (PA component), (ii) a polyoxyalkylene glycol such as polyoxyethylene glycol, polyoxy propylene glycol (PG component) and (iii) a dicarboxylic acid.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences is preferably between about 300 and 15,000, and more preferably between about 600 and 5,000. The molecular weight of the polyether sequences is preferably between about 100 and 6,000, and more preferably between about 200 and 3,000.

The amide block polyethers may also comprise randomly distributed units. These polymers may be prepared by the simultaneous reaction of polyether and precursor of polyamide blocks. For example, the polyether diol may react with a lactam (or alpha-omega amino acid) and a diacid which limits the chain in the presence of water. A polymer is obtained that has primarily polyether blocks and/or polyamide blocks of very variable length, but also the various reactive groups that have reacted in a random manner and which are distributed statistically along the polymer chain.

Suitable amide block polyethers include those as disclosed in U.S. Pat. Nos. 4,331,786; 4,115,475; 4,195,015; 4,839,441; 4,864,014; 4,230,848 and 4,332,920, the contents of each of which are herein incorporated by reference.

The polyether may be, for example, a polyethylene glycol (PEG), a polypropylene glycol (PPG), or a polytetramethylene glycol (PTMG), also designated as polytetrahydrofurane (PTHF). The polyether blocks may be along the polymer chain in the form of diols or diamines. However, for reasons of simplification, they are designated PEG blocks, or PPG blocks, or also PTMG blocks.

The polyether block comprises different units such as units which derive from ethylene glycol, propylene glycol, or tetramethylene glycol.

The amide block polyether comprises at least one type of polyamide block and one type of polyether block. Mixing of two or more polymers with polyamide blocks and polyether blocks may also be used. The amide block polyether also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of 1/1 to 3/1.

One type of polyetherester elastomer includes the family of Pebax resins, which are available from Elf-Atochem Company. Preferably, the choice can be made from among Pebax 2533, 3533, 4033, 1205, 7033 and 7233. Blends or combinations of Pebax 2533, 3533, 4033, 1205, 7033 and 7233 can also be prepared, as well. Pebax 2533 has a hardness of about 25 shore D (according to ASTM D-2240), a Flexural Modulus of 2.1 kpsi (according to ASTM D-790), and a Bayshore resilience of about 62% (according to ASTM D-2632). Pebax 3533 has a hardness of about 35 shore D (according to ASTM D-2240), a Flexural Modulus of 2.8 kpsi (according to ASTM D-790), and a Bayshore resilience of about 59% (according to ASTM D-2632). Pebax 7033 has a hardness of about 69 shore D (according to ASTM D-2240) and a Flexural Modulus of 67 kpsi (according to ASTM D-790). Pebax 7333 has a hardness of about 72 shore D (according to ASTM D-2240) and a flexural modulus of 107 kpsi (according to ASTM D-790).

Some examples of suitable polyamides for use in the compositions of the present invention include those commercially available under the tradenames CRISTAMID and RILSAN marketed by Atofina Chemicals of Philadelphia, Pa., GRIVORY and GRILAMID® marketed by EMS Chemie of Sumter, S.C., TROGAMID® and VESTAMID® available from Degussa, and ZYTEL marketed by E.I. DuPont de Nemours & Co., of Wilmington, Del.

Preferred polyamides comprise aromatic, aliphatic and cycloaliphatic blocks with aliphatic and cycloaliphatic blocks being more preferred. An especially preferred thermoplastic polyamide is based on polyamide 12 including polyamides made by substantially equimolar mixing of (bis(methyl-para-aminocyclohexyl)methane) (BMACM) and of dodecanedioic acid. The polymer obtained, Polyamide BMACM.12, is transparent, exhibits good mechanical properties and exhibits stress crack resistance in the presence of alcohols. Its glass transition temperature, measured by DSC, is 155° C., and it absorbs 3.0% by weight of water at 23° C.

Another type of polyamide for use in the inlay portion 32 and/or base portion 30 can comprise an aramid polymer. The term "aramid" as used in the present specification means a synthetic polymeric resin generally designated in the art as an aromatic polycarbonamide. For the purposes of the present invention an aramid polymer is a long-chain synthetic polyamide in which at least 85% of the amide linkages, (—CO—NH—) are attached directly to two aromatic rings. A preferred series of polymers are those characterized by recurring units of the formula

—[NH—$Ar_1$—NH—C(O)—$Ar_2$—C(O)]— wherein $Ar_1$ and $Ar_2$ independently represent p-phenylene, m-phenylene, halo-substituted p-phenylene, halo-substituted m-phenylene, 4,4-substituted diphenyl methane, or mixtures thereof. Preferably the aramid polymers are poly(para-phenyleneterephthalamide), poly(meta-phenyleneisophthalamide), chloro-substituted poly(p-phenylene terephalamide), and copolymers and combinations thereof and poly(para-phenyleneterephthalamide) and copolymers and combinations thereof are most preferred The polycarbonamides may be synthesized from the monomers 1,4-phenylenediamine (para-phenylenediamine) and terephthaloyl chloride in a condensation reaction yielding hydrochloric acid as a byproduct as in the example shown below.

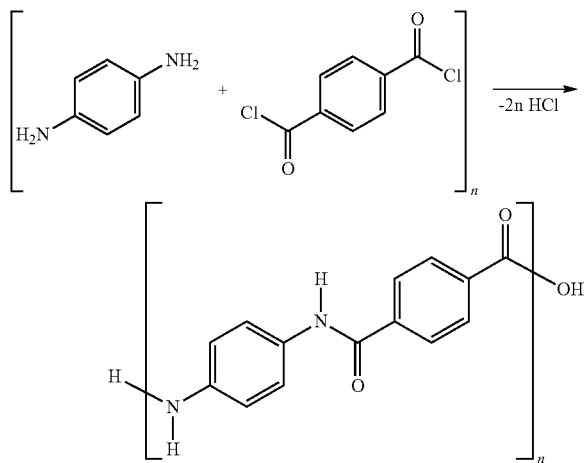

Aramid is more fully disclosed in Technical Disclosure T950,008 (95 OG 6, published Sep. 7, 1976, and based on an application originally filed Feb. 18, 1975) and U.S. Pat. Nos. 3,652,510; 3,699,085; and 3,673,143, as well as the divisional patent thereof, U.S. Pat. No. 3,817,941, the disclosures of each of which are incorporated herein by reference.

Suitable aramid polymers are commercially available under tradenames including KEVLAR®, KEVLAR 29, KEVLAR 49, and NOMEX®, NOMEX Z200 (E.I. du Pont de Nemours and Company), Twaron® (Akzo Nobel), Technora (Teijin), Teijinconex (Teijin), and Apial (Unitika).

Another preferred material which may be used as a component for use in the inlay portion 32 and/or base portion 30 is the family of polyurethanes or polyureas which are typically are prepared by reacting a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In what is known as a one-shot process, the three reactants, diisocyanate, polyol or polyamine, and optionally a chain extender or a curing agent, are combined in one step. Alternatively, a two-step process may occur in which the first step involves reacting the diisocyanate and the polyol (in the case of polyurethane) or the polyamine (in the case of a polyurea) to form a so-called prepolymer, to which can then be added either the chain extender or the curing agent. This procedure is known as the prepolymer process.

In addition, although depicted as discrete component packages as above, it is also possible to control the degree of crosslinking, and hence the degree of thermoplastic or thermoset properties in a final composition, by varying the stoichiometry not only of the diisocyanate-to-chain extender or curing agent ratio, but also the initial diisocyanate-to-polyol or polyamine ratio. Of course in the prepolymer process, the initial diisocyanate-to-polyol or polyamine ratio is fixed on selection of the required prepolymer.

Any isocyanate available to one of ordinary skill in the art is suitable for use in the polyurethanes or polyureas used in the present invention. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R preferably is a cyclic, aromatic, or linear or branched hydrocarbon moiety containing from about 1 to about 50 carbon atoms. The isocyanate also may contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); and mixtures thereof.

Any polyol now known or hereafter developed is suitable for use according to the invention. Polyols suitable for use in the present invention include, but are not limited to, polyester polyols, polyether polyols, polycarbonate polyols and polydiene polyols such as polybutadiene polyols.

Any polyamine available to one of ordinary skill in the polyurethane art is suitable for use according to the invention. Polyamines suitable for use in the compositions of the present invention include, but are not limited to, amine-terminated compounds typically are selected from amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof.

The diisocyanate and polyol or polyamine components may be combined to form a prepolymer prior to reaction with a chain extender or curing agent. Any such prepolymer combination is suitable for use in the present invention.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

In one embodiment, the number of free NCO groups in the urethane or urea prepolymer may be less than about 14 percent. Preferably the urethane or urea prepolymer has from about 3 percent to about 11 percent, more preferably from about 4 to about 9.5 percent, and even more preferably from about 3 percent to about 9 percent, free NCO on an equivalent weight basis.

Polyol chain extenders or curing agents may be primary, secondary, or tertiary polyols. Non-limiting examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Diamines and other suitable polyamines may be added to the compositions of the present invention to function as chain extenders or curing agents. These include primary, secondary and tertiary amines having two or more amines as functional groups. Exemplary diamines include aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as diethyl-2,4-toluenediamine, 4,4"-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl) ethylenediamine, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, 4,4'-methylene bis-2-chloroaniline, 2,2',3,3'-tetrachloro-4,4'-diamino-phenyl methane, p,p'-methylenedianiline, p-phenylenediamine or 4,4'-diaminodiphenyl; and 2,4,6-tris(dimethylaminomethyl) phenol.

The inlay portion 32 and/or base portion 30 may also comprise one or more ionomer resins. One family of such resins were developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

Today, there are a wide variety of commercially available ionomer resins based both on copolymers of ethylene and (meth)acrylic acid or terpolymers of ethylene and (meth) acrylic acid and (meth)acrylate, many of which may be used in the inlay portion 32 and/or base portion 30. The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights.

In addition to the unimodal and bimodal ionomers, also included are the so-called "modified ionomers" examples of which are described in U.S. Pat. Nos. 6,100,321; 6,329,458; and 6,616,552, and U.S. Pat. App. Pub. No. 2003/0158312 A1, the entire contents of all of which are herein incorporated by reference. An example of such a modified ionomer polymer is DuPont® HPF-1000 available from E.I. DuPont de Nemours and Co.

Exemplary methods of creating the inlay portion 32 and/or base portion 30 can comprise one of three methods: casting, injection molding, or compression molding. Injection molding generally involves using a mold having one or more sets of two mold sections that mate to form a cavity during the molding process. The pairs of mold sections are configured to define a cavity in their interior when mated. The mold sections are connected to openings, or gates, or point of intersection, of the mold sections through which the material to be molded flows into the cavity. The gates are connected to a runner and a sprue that serve to channel the molding material through the gates. The mold may include a number of support pins disposed throughout the mold sections. The support pins are configured to be retractable, moving into and out of the cavity. The mold itself may be a cold mold or a heated mold. In the case of a heated mold, thermal energy is applied to the material in the mold so that a chemical reaction may take place in the material. Because thermoset materials have desirable mechanical properties, it would be beneficial to producers using this process. Unfortunately, thermoset materials generally are not well suited for injection molding, because as the reactants for thermoset polyurethane are mixed, they begin to cure and become highly viscous while traveling through the sprue and into the runners of the injection mold, leading to injection difficulties. For this reason, thermoset materials typically are formed using a casting process free of any injection molding steps.

In contrast to injection molding, which generally is used to prepare structures from thermoplastic materials, casting often is used to prepare layers from thermoset material (i.e., materials that cure irreversibly). In a casting process, the thermoset material is added directly to the mold sections immediately after it is created. Then, the material may be allowed to partially cure to a gelatinous state prior to mating any additional mold sections. The material then cures to completion.

Compression molding typically requires application of heat and pressure to mold the half shells into a complete layer over the core. Compression molding also can be used as a curing step after injection molding. In such a process, an outer layer of thermally curable material is injection molded around a core in a cold mold. After the material solidifies, the ball is removed and placed into a mold, in which heat and pressure are applied to the ball to induce curing in the outer layer.

Reaction injection molding is a processing technique used specifically for certain reactive thermosetting plastics. As mentioned above, by "reactive" it is meant that the polymer is formed from two or more components which react. Generally, the components, prior to reacting, exhibit relatively low viscosities. The low viscosities of the components allow the use of lower temperatures and pressures than those utilized in traditional injection molding. In reaction injection molding, the two or more components are combined and reacted to produce the final polymerized material. Mixing of these separate components is critical, a distinct difference from traditional injection molding.

The base portion 30 can comprise a durable polymeric material that can be injection molded. The material of the base portion 30 can be less rigid than the material of the inlay portion 32, such that it is more flexible than the inlay portion yet still sufficiently durable to retain cleat receptacles 34 and to serve as an external traction surface of a golf shoe. The base portion 30 can comprise TPU, for example. In some embodiments, the base portion 30 can comprise TPU having a Shore A hardness less than the Shore A hardness of the material of the inlay portion 32. For example, the base portion 30 can comprise TPU having a Shore A hardness less than 90, less than 80, less than 75, less than 70, and/or less than 65, such as about 60 in some particular embodiments. In some embodiments, the material of the base layer 30 can have a Shore A hardness that is at least 10, at least 15, at least 20, and/or at least 25 less than the Shore A hardness of the inlay portion 32.

Due to its relatively greater hardness and rigidity, the inlay portion 32 can provide a reinforcement region along the outsole 10 that supports the outsole during different portions of the golf swing. For example, the inlay portion can provide additional torque resistance that limits the twisting of the outsole during the golf swing. At the same time, the relatively softer base portion 30 can give the outsole 10 a greater degree of flexibility during the golf swing that can provide increased traction and can provide increased comfort for the golfer.

The fill portion 36 can comprise a durable yet soft material that can be liquefied and poured or injected into the base subunit. The fill portion 36 can provide a cushioning layer that conforms to the golfer's foot and provides increased comfort. Desirably, the fill portion 36 material when liquefied is sufficiently flowable to fill all of the open areas along the upper surface of the base subunit within the rim 70 without leaving substantial air gaps. The fill portion 36 material can bond with the base subunit material as it solidifies without the use of cement or other adhesives, which can provide a more flexible and comfortable outsole. The fill portion 36 material can have a relatively lower Shore A hardness than the base portion 30 and the inlay portion 32.

In a preferred embodiments, the fill portion 36 can comprise a poured liquid polyurethane. Exemplary PU materials for the fill portion 36 can include either TPU or thermoset PU. There are many different polyurethane formulations known to those skilled in the art. The most important feature of the polyurethane formulation employed is that the polyurethane resin components after mixing remain in liquid form for a sufficient time to allow for the mixture to be subsequently poured into a mold prior to the curing or crosslinking reaction and subsequent solidification. A satisfactory polyurethane for this invention is marketed under the tradename ELASTOPAN CS 9600 by BASF.

The liquid polyurethane for the fill portion 36 will typically be poured into the mold gate at a temperature of about 180° F. The liquid polyurethane will flow about the cavity of the mold and into the body of the base portion 30 up to the rim 70. In this manner, a high integrity bond will be formed with the surface of the base subunit thus essentially forming the fill portion integral with the body of the outsole including any undulating surfaces such that a relatively complete encapsulation of the cavity defined by the base subunit 35 and complete bonding is achieved resulting in a durable insole with no priming or cementing requirement. It is to be appreciated that other materials that will enhance the cushioning effect can be used for forming the fill portion such as ethyl vinyl acetate (EVA). Other suitable materials for forming the fill portion will become readily apparent to those skilled in the art, given the benefit of this disclosure.

Other materials that are suitable for the fill portion 36 can include a variety of thermoplastic polymeric and resinous materials which may be expanded to porous, multicellular, solidified foam-like structures by the action of various propellants or agents for expanding or blowing the materials. The unexpanded material may be in the form of a thermoplastic gel and the like or it may be in the form of completely unexpanded or further expandable discrete particles such as granules, beads and similar forms. The blowing agents, in accordance with common practice, are usually gases, gas generating substances or highly fugacious liquids, which may or may not be solvents for the thermoplastic resinous material that have been dissolved or otherwise intimately incorporated within the thermoplastic resinous material while it is in an unexpanded form. The presence or application of heat to an unfoamed thermoplastic material containing a blowing agent causes the blowing agent to be released or thermally expanded, or both, while the thermoplastic material is at or attaining a foaming temperature at which it is sufficiently softened and yieldable to permit the pressure of the thermally expanding blowing agent to expand it into the desired foam structure. In many cases the foaming may be accomplished by simultaneously releasing the blowing agent-containing material from a confining pressure while it is at or being heated to a foaming temperature.

Foamed materials that are suitable for the fill portion 36 can include any number of specific materials commonly used to prepare foams such as polyurethane, polyurea, polyethylene, polystyrene, polyisoprene, ethylene vinyl acetate (EVA), ethylene propylene diene monomer (EPDM), polyester, polypropylene, polybutadiene, polyisoprene, ionomer, nylon, acetal, teflon, polycarbonate, acrylic, neoprene, silicone, polymethylpentene, acrylonitrile butadiene styrene (ABS), polyetheretherketone, polyvinyl chloride, chlorinated polyethylene (CPE) polyisocyanurate acrylate copolymers, such as EMA, EBA, Nucrel® type acid co and terpolymers, ethylene propylene rubber (such as EPR, EPDM, and any ethylene copolymers), styrene-butadiene, SEBS (any Kraton-type), PVC, PVDC, polyalkenamer, epoxy foams, urea-formaldehyde foams, latex foams and sponge, silicone foams, flouorpolymer foams and syntactic foams (hollow sphere filled) or the like.

Foam structures may also be formed into cross-linked foam beads suitable for molding into articles. To make the foam beads, discrete resin particles such as granulated resin pellets are: suspended in a liquid medium in which they are substantially insoluble such as water; impregnated with a cross-linking agent and a blowing agent at an elevated pressure and temperature in an autoclave or other pressure vessel; and rapidly discharged into the atmosphere or a region of reduced pressure to expand to form the foam beads. The foam beads may then be molded by any means known in the art to form the golf ball cores of the present invention.

Alternatively, the foam beads can also be prepared by preparing a mixture of polymer, cross-linking agent, and decomposable mixtures in a suitable mixing device or extruder and form the mixture into pellets, and heat the pellets to cross-link and expand.

A special class of closed-cell foams are foams containing microspheres embedded in a matrix material. Additional materials include the closed-cell foams incorporating microspheres as described in U.S. Pat. No. 7,073,277, which is incorporated by reference herein in its entirety. Other exemplary materials that may be used in the present invention are described in U.S. Pat. Nos. 5,824,746; 6,025,442; and 7,708,654, all of which are incorporated by reference herein in their entireties.

One material which may be used to prepare the foamed materials that are suitable for the fill portion 36 can include foams made from polyethylene. Excellent teachings to processes for making ethylenic polymer foam structures and processing them can be found in C. P. Park, "Polyolefin Foam," Chapter 9, Handbook of Polymer Foams and Technology, edited by D. Klempner and K. C. Frisch, Hanser Publishers, Munich, Vienna, New York, Barcelona (1991), pp. 224-233, as well as U.S. Pat. Nos. 3,616,365; 3,886,100; 3,959,189; 4,168,353; and 4,429,059, the teachings of each of which are incorporated herein by reference.

Another material to form the foamed materials that are suitable for the fill portion 36 includes an alkenyl aromatic polymer such as polystyrene. The most preferable types of styrenic foams employed are the closed-cell extruded foams and expanded bead foams. Generally, polystyrene foams for the present application preferably have a relatively small cell size which exhibits excellent dimensional stability. Another material suitable for the fill portion 36 can include foams prepared from blends of polystyrene and polyethylene resins. Japanese Patent Publication No. 34,662/1977 discloses a method of mixing the two resins in the presence of a specific mixed medium and Japanese Patent Laying-Open No. 35,471/1974 describes a method of polymerizing styrene as contained in polyethylene resin; both of these methods being ultimately directed toward foaming the combined resins. U.S. Pat. No. 4,652,588 (the disclosure of which is herein incorporated by reference in its entirety) discloses extruded or bead foams prepared from a blend of an ethylenic polymer resin with a melt index (MI) in the range of from 0.2 to 2.6 g/10 minutes and a styrenic polymer resin with a melt flow index (MFI) in the range of from 1.4 to 18 g/10 minutes, to yield a foam which exhibits a well-balanced combination of flexibility and compression strength, excellence in compression recovery, resistance to distortion due to repeating compression, and high durability.

Another material especially suitable to prepare the foamed materials that are suitable for the fill portion 36 can include foams made from an ionomer modified polyolefin foam which is essentially closed cell in structure. The polyolefin used is preferably a low density polyethylene or a polypropylene resin which during extrusion with proper additives will form a fine, closed cell foam. The ionomer resins employed in the basic foamable mixture are derived from ethylene/(meth)acrylic acid copolymers and include the family of "Surlyn" ionomers (a registered trademark of DuPont Co.).

Another material especially suitable to prepare the foamed materials for the fill portion 36 is polyurethane. Generally, polyurethane and polyurea foams are prepared by reacting an organic polyisocyanate with an active hydrogen-containing compound in the presence of the blowing agent or agents. The preparation of polyurethane foam has been described for example, in U.S. Pat. Nos. 4,076,644; 4,264,970; and 4,636,529 the disclosures of each of which are herein incorporated by reference. Alternatively, polyurethane and polyurea foams may be prepared by reaction injection molding, where a gas, typically nitrogen, is essentially whipped into at least one component of the polyurethane, typically, the pre-polymer, prior to component injection into a closed mold where full reaction takes place resulting in a cured polymer having a reduced specific gravity.

More information regarding eTPU and other foams based on thermoplastic polyurethanes can be found in U.S. Pat. App. Pub. No. 2010/0222442 A1, which is incorporated by reference herein in its entirety. Additionally, exemplary methods for production of eTPU using water as a blowing agent or propellant are described in U.S. Pat. App. Pub. No. 2012/0065285 A1, which is incorporated by reference herein in its entirety. In some embodiments, the fill portion 36 can comprise a hybrid material comprising a matrix of PU and foamed particles of TPU or other thermoplastic elastomers, as described in U.S. Pat. App. Pub. No. 2010/0047550 A1, which is incorporated by reference herein in its entirety.

An especially preferred material to be used for the fill portion 36 are the closed cell foam materials incorporating microspores as described in U.S. Pat. No. 7,073,277 issued on Jul. 6, 2011 to Taylor Made Golf Co., Inc. the entire contents of which are incorporated by reference herein.

It will be appreciated that the principles and embodiments disclosed herein have application to other types of athletic shoes/outsoles that are subject to dynamic loading and weight shifting and require outstanding traction and comfort, especially athletic shoes used on turf surfaces.

In view of the many possible embodiments to which the principles of this disclosure may be applied, it should be recognized that the illustrated embodiments are only preferred examples and should not be taken as limiting the scope of the disclosure. Rather, the scope of the disclosure is at least as broad as the following claims. We therefore claim all that comes within the scope and spirit of these claims.

We claim:

1. A golf shoe outsole comprising:
    a lower portion having a traction surface and comprising thermoplastic polyurethane; and
    an upper portion bonded to the lower portion for supporting a golfer's foot and comprising poured polyurethane or expandable thermoplastic polyurethane;
    wherein the lower portion comprises a first thermoplastic polyurethane material having a first hardness and a second thermoplastic polyurethane material having a second hardness that is less than the first hardness; and
    wherein the first thermoplastic polyurethane material comprises a curved band that extends from a toe end of the outsole, along a lateral side of a forefoot region of the outsole, across an arch portion of the outsole, and along a medial side of a heel portion of the outsole, and the curved band contains golf cleat receptacles.

2. The golf shoe outsole of claim 1, wherein the lower portion comprises a recessed region along its upper side and the upper portion fills the recessed region.

3. The golf shoe outsole of claim 1, wherein the upper portion is bonded directly to the lower portion without an intermediate adhesive material.

4. The golf shoe outsole of claim 1, wherein the upper portion comprises a matrix of polyurethane and foamed particles of thermoplastic polyurethane.

5. The golf shoe outsole of claim 1, wherein the curved band includes at least one golf cleat receptacle along the lateral side of the forefoot region of the outsole and at least one golf cleat receptacle along the medial side of the outsole.

6. The golf shoe outsole of claim 1, wherein the curved band includes at least two golf cleat receptacles along the lateral side of the forefoot region of the outsole and at least two golf cleat receptacles along the medial side of the outsole.

7. The golf shoe outsole of claim 1, wherein the curved band includes at least one golf cleat receptacle in the arch portion of the outsole.

8. The golf shoe outsole of claim 1, wherein the curved band includes non-removable nub cleats.

9. The golf shoe outsole of claim 1, wherein the curved band includes a plurality of discrete platforms coupled together by relatively narrower connector portions.

10. The golf shoe outsole of claim 9, wherein the plurality of discrete platforms comprises at least five discrete platforms.

11. The golf shoe outsole of claim 9, wherein each of the golf cleat receptacles is contained in a different one of the plurality of discrete platforms.

12. The golf shoe outsole of claim 1, wherein the second thermoplastic polyurethane material contains additional golf cleat receptacles.

13. The golf shoe outsole of claim 12, wherein the additional golf cleat receptacles include at least one golf cleat receptacle along a medial side of the forefoot region of the outsole and at least one golf cleat receptacle along a lateral side of a heel portion of the outsole.

14. The golf shoe outsole of claim 12, wherein the additional golf cleat receptacles include at least two golf cleat receptacles along a medial side of the forefoot region of the outsole and at least two golf cleat receptacles along a lateral side of a heel portion of the outsole.

15. The golf shoe outsole of claim 12, wherein the second thermoplastic polyurethane material includes non-removable nub cleats.

* * * * *